United States Patent
Stefik et al.

(10) Patent No.: US 8,930,388 B2
(45) Date of Patent: Jan. 6, 2015

(54) SYSTEM AND METHOD FOR PROVIDING ORIENTATION INTO SUBJECT AREAS OF DIGITAL INFORMATION FOR AUGMENTED COMMUNITIES

(71) Applicant: Palo Alto Research Center Incorporated, Palo Alto, CA (US)

(72) Inventors: Mark Jeffrey Stefik, Portola Valley, CA (US); Barbara S. Stefik, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/203,507

(22) Filed: Mar. 10, 2014

(65) Prior Publication Data
US 2014/0195543 A1   Jul. 10, 2014

Related U.S. Application Data

(63) Continuation of application No. 12/190,557, filed on Aug. 12, 2008, now Pat. No. 8,671,104.

(60) Provisional application No. 60/998,636, filed on Oct. 12, 2007.

(51) Int. Cl.
G06F 17/30   (2006.01)
G06N 5/02    (2006.01)

(52) U.S. Cl.
CPC .... *G06F 17/30321* (2013.01); *G06F 17/30648* (2013.01); *G06N 5/022* (2013.01)
USPC .......................................................... 707/759

(58) Field of Classification Search
USPC .......................................................... 707/759
See application file for complete search history.

(56) References Cited

U.S. PATENT DOCUMENTS 5,257,939 A   11/1993  Robinson et al.
5,369,763 A   11/1994  Biles
(Continued)

FOREIGN PATENT DOCUMENTS

EP    1571579       9/2005
WO    2005073881    8/2005
WO    2007047903    4/2007

OTHER PUBLICATIONS

C. Holahan, "So Many Ads, So Few Clicks," BusinessWeek, p. 38 (Nov. 12, 2007).
Rocha L. M., "Adaptive Webs for Heterarchies With Diverse Communities of Users," Workshop From Intelligent Networks to the Global Brain: Evolutionary Technology, pp. 1-35 (Jul. 3, 2001).

(Continued)

*Primary Examiner* — Hosain Alam
*Assistant Examiner* — Johnese Johnson
(74) *Attorney, Agent, or Firm* — Patrick J. S. Inouye; Makiko Coffland

(57) ABSTRACT

A system and method for providing orientation into subject areas of digital information for augmented communities is provided. Topics are provided for subject areas. Each subject area is associated with an augmented community and each topic is hierarchically organized under a fine-grained topic category. Evergreen indexes are maintained and includes topic models that are each matched to topics associated with each augmented community. Interrelatedness of the evergreen indexes is determined by identifying the topics found in the topic hierarchy for each evergreen index that are shared. A social network including neighbors made up of each augmented community associated with each interrelated evergreen index is formed. A user interest is determined and each of the plurality of topic models for the evergreen indexes is evaluated against the digital information. Access to the digital information via the identified best matched evergreen index and the identified other evergreen index is provided.

20 Claims, 10 Drawing Sheets

(56) References Cited

U.S. PATENT DOCUMENTS

| | | | |
|---|---|---|---|
| 5,530,852 | A | 6/1996 | Meske et al. |
| 5,671,342 | A | 9/1997 | Millier et al. |
| 5,680,511 | A | 10/1997 | Baker et al. |
| 5,724,567 | A | 3/1998 | Rose et al. |
| 5,784,608 | A | 7/1998 | Meske et al. |
| 5,907,677 | A | 5/1999 | Glenn et al. |
| 5,907,836 | A | 5/1999 | Sumita et al. |
| 5,953,732 | A | 9/1999 | Meske et al. |
| 6,021,403 | A | 2/2000 | Horvitz et al. |
| 6,052,657 | A | 4/2000 | Yamron et al. |
| 6,064,952 | A | 5/2000 | Imanaka et al. |
| 6,233,570 | B1 | 5/2001 | Horvitz et al. |
| 6,233,575 | B1 | 5/2001 | Agrawal et al. |
| 6,240,378 | B1 | 5/2001 | Imanaka et al. |
| 6,247,002 | B1 | 6/2001 | Steels |
| 6,269,361 | B1 | 7/2001 | Davis et al. |
| 6,285,987 | B1 | 9/2001 | Roth et al. |
| 6,292,830 | B1 | 9/2001 | Taylor et al. |
| 6,397,211 | B1 | 5/2002 | Cooper |
| 6,598,045 | B2 | 7/2003 | Light et al. |
| 6,772,120 | B1 | 8/2004 | Moreno et al. |
| 6,804,688 | B2 | 10/2004 | Kobayashi et al. |
| 6,981,040 | B1 | 12/2005 | Konig et al. |
| 7,062,485 | B1 | 6/2006 | Jin et al. |
| 7,092,888 | B1 | 8/2006 | McCarthy et al. |
| 7,200,606 | B2 | 4/2007 | Elkan |
| 7,275,061 | B1 | 9/2007 | Kon et al. |
| 7,281,022 | B2 | 10/2007 | Gruhl et al. |
| 7,293,019 | B2 | 11/2007 | Dumais et al. |
| 7,320,000 | B2 | 1/2008 | Chitrapura et al. |
| 7,426,557 | B2 | 9/2008 | Gruhl et al. |
| 7,467,202 | B2 | 12/2008 | Savchuk |
| 7,496,567 | B1 | 2/2009 | Steichen |
| 7,548,917 | B2 | 6/2009 | Nelson |
| 7,707,206 | B2 | 4/2010 | Encina et al. |
| 7,747,593 | B2 | 6/2010 | Patterson et al. |
| 7,809,723 | B2 | 10/2010 | Liu et al. |
| 7,890,485 | B2 | 2/2011 | Malandain et al. |
| 2002/0161838 | A1 | 10/2002 | Pickover et al. |
| 2004/0059708 | A1 | 3/2004 | Dean et al. |
| 2005/0097436 | A1 | 5/2005 | Kawatani |
| 2005/0226511 | A1 | 10/2005 | Short |
| 2005/0278293 | A1 | 12/2005 | Imaichi et al. |
| 2006/0167930 | A1 | 7/2006 | Witwer et al. |
| 2007/0050356 | A1 | 3/2007 | Amadio |
| 2007/0156622 | A1 | 7/2007 | Akkiraju et al. |
| 2007/0214097 | A1 | 9/2007 | Parsons et al. |
| 2007/0239530 | A1 | 10/2007 | Datar et al. |
| 2007/0244690 | A1 | 10/2007 | Peters |
| 2007/0260508 | A1 | 11/2007 | Barry et al. |
| 2007/0260564 | A1 | 11/2007 | Peters et al. |
| 2007/0271086 | A1 | 11/2007 | Peters et al. |
| 2008/0040221 | A1 | 2/2008 | Wiseman et al. |
| 2008/0065600 | A1 | 3/2008 | Batteram et al. |
| 2008/0126319 | A1 | 5/2008 | Bukai et al. |
| 2008/0133482 | A1 | 6/2008 | Anick et al. |
| 2008/0201130 | A1 | 8/2008 | Peters et al. |
| 2008/0307326 | A1 | 12/2008 | Gruhl et al. |
| 2010/0070485 | A1 | 3/2010 | Parson et al. |
| 2010/0114561 | A1 | 5/2010 | Yasin |

OTHER PUBLICATIONS

Arasu et al., "Searching the Web," ACM, New York, NY, US, pp. 2-43 (Aug. 1, 2001).
P. Lenssen, "How Google News Indexes". See http://blogoscoped.com/archive/2006-07-28-n49.html.
A. Agarval, "How Google News works". http://labnol.blogspot.com/2005/05/how-google-news-works.html.
M. Helft, "How a Series of Mistakes Hurt Shares of United". New York Times. http://www.nytimes.com/2008/09/15/technology/15google.html?_r=1.
J. Preston, "Why Google News works." http://eatsleeppublish.com/why-google-news-works/.
Wikipedia, the Free Encyclopedia, "Google News". http://en.wikipedia.org/wiki/Google_News.
Imai et al., "Improved Topic Discrimination of Broadcast News Using a Model of Multiple Simultaneous Topics," 1997 IEEE International Conference on Acoustics, Speech, and Signal Processing (ICASSP '97), Apr. 1997, pp. 727-730, vol. 2.
Anonymous "TF-IDF," Wikipedia, the free encyclopedia (Jul. 23, 2007).
Akiko Aizawa, "An Information-Theoretic Perspective of TF-IDF Measures," Information Processing and Management, Elsevier Science Ltd., vol. 39, No. 1, pp. 45-65 (Jan. 1, 2003).
Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).
Bracewell et al., "Reading: A Self Sufficient Internet News System with Applications in Information and Knowledge Mining," Natural Language Processing and Knowledge Engineering, International Conference, IEEE, PI, pp. 190-96 (Aug. 1, 2007).
Yu et al, "PEBL: Positive Example Based Learning for Web Page Classification Using SVM," Proc. of ACM SIGKDD International Conference on Knowledge Discovery and Data Mining (2002).
C. Anderson, "The Long Tail: Why the Future of Business is Selling Less of More," 2006, Chapter 1, pp. 1-26, Hyperion Press, New York.
Schutze H., "The Hypertext Concordance: A Better Back-of-the-Book Index," 1998, Proceedings of Workshop on Computational Technology, pp. 101-104, Montreal, Canada.
Arampatzis et al., "An Evaluation of Linguistically-Motivated Indexing Schemes," 2000, Proceedings of the BCSIRSG.
Biebricher et al., "The Automatic Indexing System AIR/PHYS—1997, From Research to Application," In Readings in Information Retrieval, Morgan Kaufmann Publishers, San Francisco.
G. Sacco, "Dynamic Taxonomies and Guided Searches," Journal of the American Society for Information Science and Technology, vol. 57, Issue 6, Apr. 2006.
Rajashekar et al., "Combining Automatic and Manual Index Representations in Probabilistic Retrieval," www.google.com.
Haav et al., "A Survey of Concept-Based Information Retrieval Tools on the Web," http://greta.cs.ioc.ee/~helemai/HaavLubiADBIS2001.pdf.
Brin et al., "The Anatomy of a Large-Scale Hypertextual Web Search Engine," Paper presented at the Seventh International Conference on World Wide Web. Apr. 14-18, 1998, Brisbane, Australia.
Card et al., "Readings in Information Visualization: Using Vision to Think," 1999, Section 3 Interaction, pp. 231-259, 295-306, Morgan Kaufmann Publishers, San Francisco.
Chi et al., "EBooks With Indexes that Reorganize Conceptually," Paper presented at Human Factors in Computing Systems Conference Apr. 24-29, 2004, Vienna, Austria.
G. W. Furnas, "Generalized Fisheye Views," Paper presented at the Conference on Human Factors in Computing Systems, 1986, Boston, Massachusetts.
Kusek et al., "The Future of Music: Manifesto for the Digital Music Revolution," 2005, pp. 154-156, Boston: Berklee Press.
P. Pirolli, "Information Foraging Theory: Adaptive Interaction with Information," 2007, pp. 1-29, 39-43, 48-67, 183-192, Oxford: Oxford University Press.
H. Simon, "Designing Organizations for an Information-Rich World." In Communications and the Public Interest, ed. Martin Greenberger. 37-72. The Johns Hopkins Press, 1971.
R. D. Burt, "Structural Holes and Good Ideas," American Journal of Sociology, vol. 110, No. 2, pp. 349-399, 2003.
C. Mezei, "The Digg Algorithm-Unofficial FAQ," SeoPedia, www.secopedia.org/tips-tricks/social-media/the-digg-algorithm-unofficial-faq, Nov. 2, 2006.
N. Patel, "There's More to Digg Than Meets the Eye," Pronet Advertising, www.pronetadvertising.com/articles/theres-more-to-digg-than-meets-the-eye.html, Jan. 15, 2007.
J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.
G. A. Miller, "The Magical Number Seven, Plus or Minus Two: Some Limits on Our Capacuty for Processing Information," Psychological Review, vol. 63, pp. 81-97, 1956.
J. Dowdell, "Digg Algorithm for Scoring Stories," Marketing Shift, www.marketingshift.com/2006/9/diggs-algorithm-elements-confirmed.cfm, Sep. 8, 2006.

SYSTEM AND METHOD FOR PROVIDING ORIENTATION INTO SUBJECT AREAS OF DIGITAL INFORMATION FOR AUGMENTED COMMUNITIES

CROSS-REFERENCE TO RELATED APPLICATION

This patent application is a continuation of U.S. patent application Ser. No. 12/190,557, filed Aug. 12, 2008, pending, which is a non-provisional patent application that claims priority under 35 U.S.C. §119(e) to U.S. Provisional Patent Application, Ser. No. 60/998,636, filed Oct. 12, 2007, the disclosure of which is incorporated by reference.

FIELD

This application relates in general to digital information sensemaking and, in particular, to a system and method for providing orientation into subject areas of digital information for augmented communities.

BACKGROUND

Digital sensemaking is sensemaking mediated by a digital information infrastructure, such as the Worldwide Web ("Web"). Through the Web, users can access both "traditional" Web sites that post information from diverse sources and interactive Web sites, including moderated Web logs or "blogs," user forums, and Web sites with voting, which allow users to actively rank new information.

As a digital information repository, the Web continually evolves. New information is posted continuously, often in response to a growing area of new subject matter around which a topical interplay of questions and answers has developed. Despite this continual evolution, information awareness through the Web remains artificially constrained. Mainstream media Web sites generally only cover popular topics, such as news, business, politics, sports, entertainment, and weather, but a host of additional topics exist through other Web sources, which may fall outside the scope of a reader's, or publisher's, core set of interests. These topics range from slightly less popular topics, for instance, technology news, to specialized or obscure topics that are relevant to a comparatively small number of people, such as evening class schedules for a local community college.

The demand for items in many markets follows a "Long Tail" distribution, such as described in C. Anderson, *The Long Tail: Why the Future of Business is Selling Less of More*, (Hyperion Press) (2006), the disclosure of which is incorporated by reference. FIG. 1 is a graph showing, by way of example, a hypothetical long tail distribution 10 for digital information. The x-axis represents digital information and the y-axis represents popularity level. Items appearing at the head of the distribution 11, although few in number, enjoy the greatest popularity, such as media stories falling into a small number of popular categories. However, items along the "long tail" 12, which cover niche topics with smaller readerships, outnumber head items 11. Although any single head item 11 enjoys greater popularity than any one of the long tail items 12, the aggregate popularity of a large enough group of long tail items 12 will exceed the popularity of all head items 11 when enough long tail items 12 are included, which implies that a larger overall audience could be reached by focusing on long tail topics, provided the audience can be familiarized and made aware of them. Consumers of information have only a limited amount of time and cannot pay attention to everything. As more topics become available, mainstream topics receive a shrinking fraction of readers' attention. Analogously, prime time television audiences are currently shrinking, as cable and satellite networks improve their programming and increase their viewership. Similarly, musical "hits" today sell fewer copies than sold a decade ago, as more choices and purchasing options become available. The economics and popularity trends from these observations can be succinctly summarized: "if you give people choices, they take them" and "the head of the distribution is shrinking."

The problem is not only finding new or popular information: the problem is being able to get correct answers to questions about a new subject area, even though the subject area is unfamiliar and the right questions to ask are uncertain or unknown. Regular readers of information available on the Web represent informal communities of individuals sharing a common interest in a core area of subject matter. Through their online interchanges, the subject area is developed and matures. For instance, useful hyperlinks to the best resources for specific concerns are frequently exchanged via online forum postings or memorialized in Web sites dedicated to the subject area. However, newcomers to the subject area are rarely know where to begin or even what to ask, and valuable tidbits of knowledge, like the useful hyperlinks, remain out of reach unless found through focused search or perchance.

Therefore, a need remains in digital sensemaking for enabling a reader to become efficiently oriented to a new subject area and leveraging the efforts of other readers who are already familiar with and instrumental to the subject area.

SUMMARY

A system and method for providing orientation into digital information provides what's new, what's true, and what matters. "What's new" means delivering current information from outside the boundaries of a core set of topics. "What's true" means information from multiple sources has already been socially vetted to establish level of interest and authoritativeness. "What matters" means that information is automatically categorized according to important topics in a reader's subject area.

New and relevant digital information is discovered by augmented communities of readers by utilizing fine-grained topical indexes sheparded by knowledge domain experts, the "hard work of the few;" by aggregating rankings and suggestions about better categorizing by a large community of users, "the light work of the many" or "the wisdom of crowds;" and by extending the topical indexes though machine-assisted learning, the "tireless work of the machines." Each augmented community has an evergreen index, which includes topic models, such as patterns, for each topic and subtopic that can be used to test whether given material is on point. The term "evergreen" is intended to connote a quality of freshness and currency for an index, so that new articles will be classified automatically and added to the index when they appear and that new topics can be added to the index as needed.

A reader who is unfamiliar with a particular subject area can quickly become oriented by harnessing the power of the topical evergreen indexes belonging to those augmented communities having a core interest in that subject area. Each evergreen index exposes a layered organization of topics and subtopics, which embodies expert judgments about how the members of the augmented community that owns the index want to use the information in the subject area. The topics and subtopics can be analogized to the important questions that could be asked with respect to the subject area. The structuring of the index describes one perspective on how best to navigate the subject area, which has been implicitly "endorsed" by the community's members who are already familiar with or oriented to the subject area.

One embodiment provides a system and method for providing orientation into subject areas of digital information for augmented communities. Topics are provided for subject areas. Each subject area is associated with an augmented community and each topic is hierarchically organized under a fine-grained topic category. Evergreen indexes are maintained and includes topic models that are each matched to topics associated with each augmented community. Interrelatedness of the evergreen indexes is determined by identifying the topics found in the topic hierarchy for each evergreen index that are shared. A social network including neighbors made up of each augmented community associated with each interrelated evergreen index is formed. A user interest is determined and each of the plurality of topic models for the evergreen indexes is evaluated against the digital information. Access to the digital information via the identified best matched evergreen index and the identified other evergreen index is provided.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Figure 1:
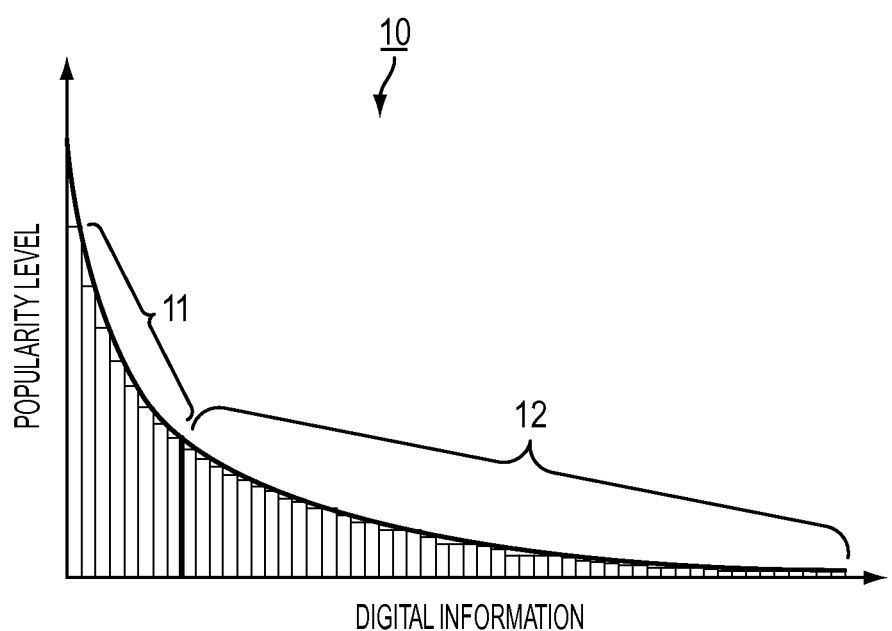
FIG. 1 is a graph showing, by way of example, a hypothetical long tail distribution for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a topic model and the set of pages contains all of the pages that match the topic model. A cited page can also be smaller than an entire page, such as a paragraph, which can be matched by a topic model.

Subject Area: The set of topics and subtopics in a social index, including an evergreen index.

Topic: A single entry within a social index. In an evergreen index, a topic is accompanied by a topic model, such as a pattern, that is used to match documents within a corpus.

Subtopic: A single entry hierarchically listed under a topic within a social index. In an evergreen index, a subtopic is also accompanied by a topic model.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Sensemaking

Figure 2:
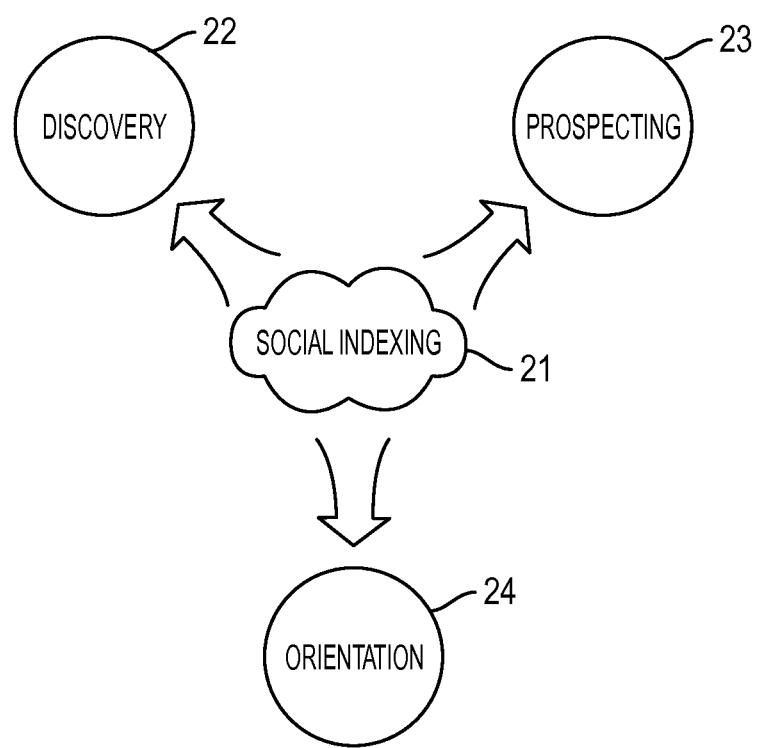
FIG. 2 is a functional block diagram showing challenges in digital sensemaking.

The Web and other online information resources provide an ever-evolving and expanding source of digital information. New areas of subject matter appear and evolve as readers become attracted and interact. Digital sensemaking is about making sense out of the information in these resources. FIG. 2 is a functional block diagram 20 showing challenges in social indexing 21: digital information discovery 22, prospecting 23, and orientation 24. Other challenges are possible. These challenges represent different facets of information foraging, which work synergistically to provide new, relevant, and authoritative digital information through a topically fine-grained and socially-vetted infrastructure. Each challenge will now be summarized.

Digital information discovery 22 focuses on identifying new and topically-relevant information for a set of core interests, as further described in commonly-assigned U.S. Pat. No.

8,165,985, the disclosure of which is incorporated by reference. Digital information discovery begins with the premise that each person has a set of core interests with a need for information spanning multiple topics within the core interests, including long tail topics, with varying levels of importance. The key challenge is in efficiently tracking new information on the core interests.

Digital information prospecting 23 focuses on foraging or mining an individual's information frontier as an aid to idea synthesis, as further described in commonly-assigned U.S. Pat. No. 8,073,682, the disclosure of which is incorporated by reference. Information prospecting expands an individual's information diet beyond existing interests, as fundamentally satisfied through digital information discovery 22, by tapping into a social network of communities. For example, information frontiers for local news includes news from neighboring towns and cities. As another example, information frontiers for a professional interest, such as family dentistry, potentially includes relevant topics from related fields, for instance, dental hygiene, new dental materials, and perhaps new antibiotics or results from cosmetic dentistry. Digital information prospecting facilitates efficient attention allocation without risking the distractions or inefficiencies in covering uncharted new topical ground. The key challenge is in finding the most relevant information from neighboring subject areas along the frontier.

Figure 7:
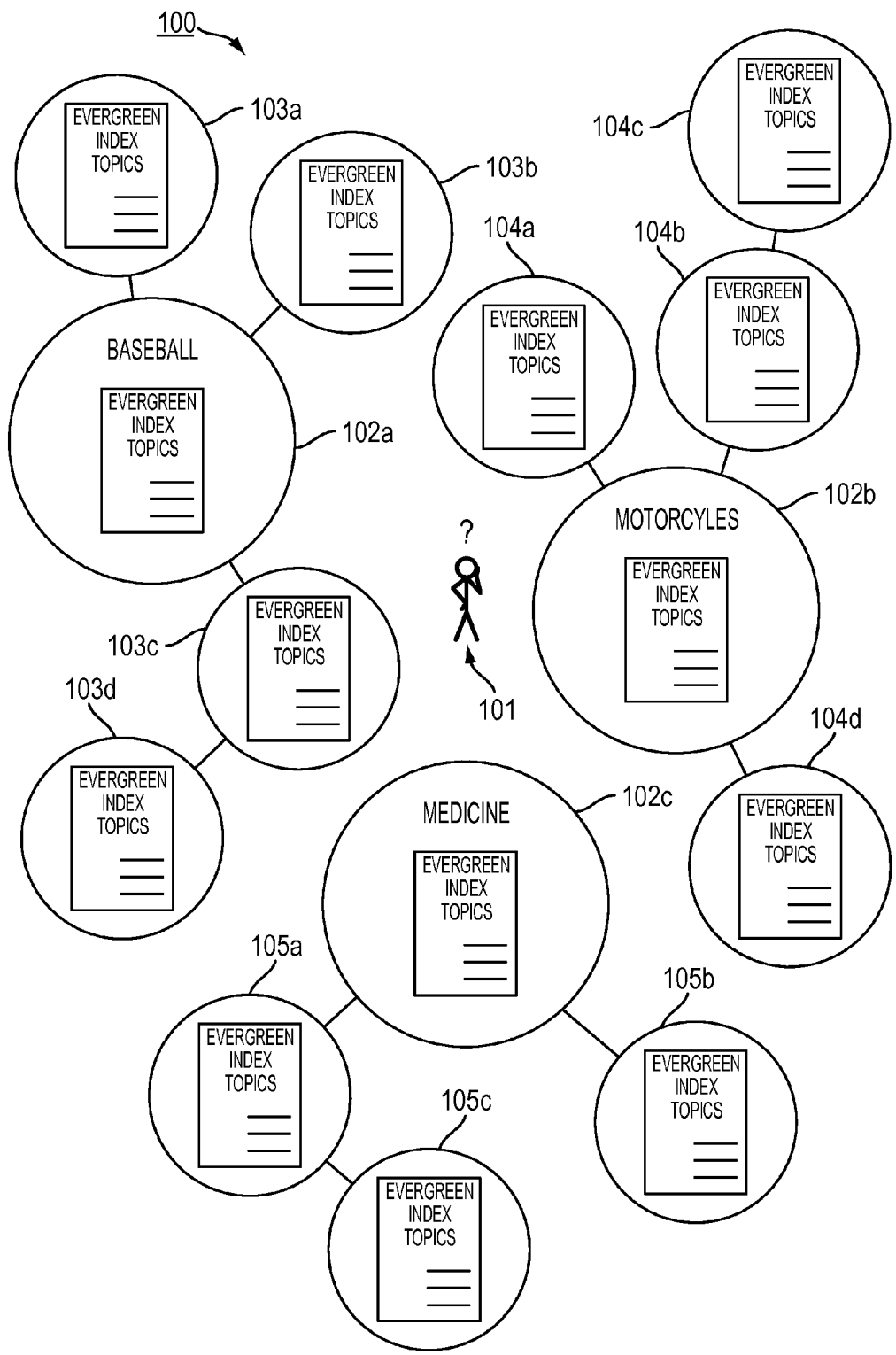
FIG. 7 is a data flow diagram showing, by way of example, the scopes of core subject matter for sets of augmented communities.

Finally, digital information orientation 24, the focal point of this application, is about becoming oriented to an unfamiliar subject area, as further described below beginning with reference to FIG. 7. Digital information orientation is about efficiently gaining an understanding of a new subject area. This activity is complementary to information discovery and prospecting information frontiers, reflecting the case where the objective is to explore an area to learn about the subject matter generally. The activity includes learning the topic structure and main results, as well as identifying good references.

Digital Information Sensemaking Environment

Figure 3:
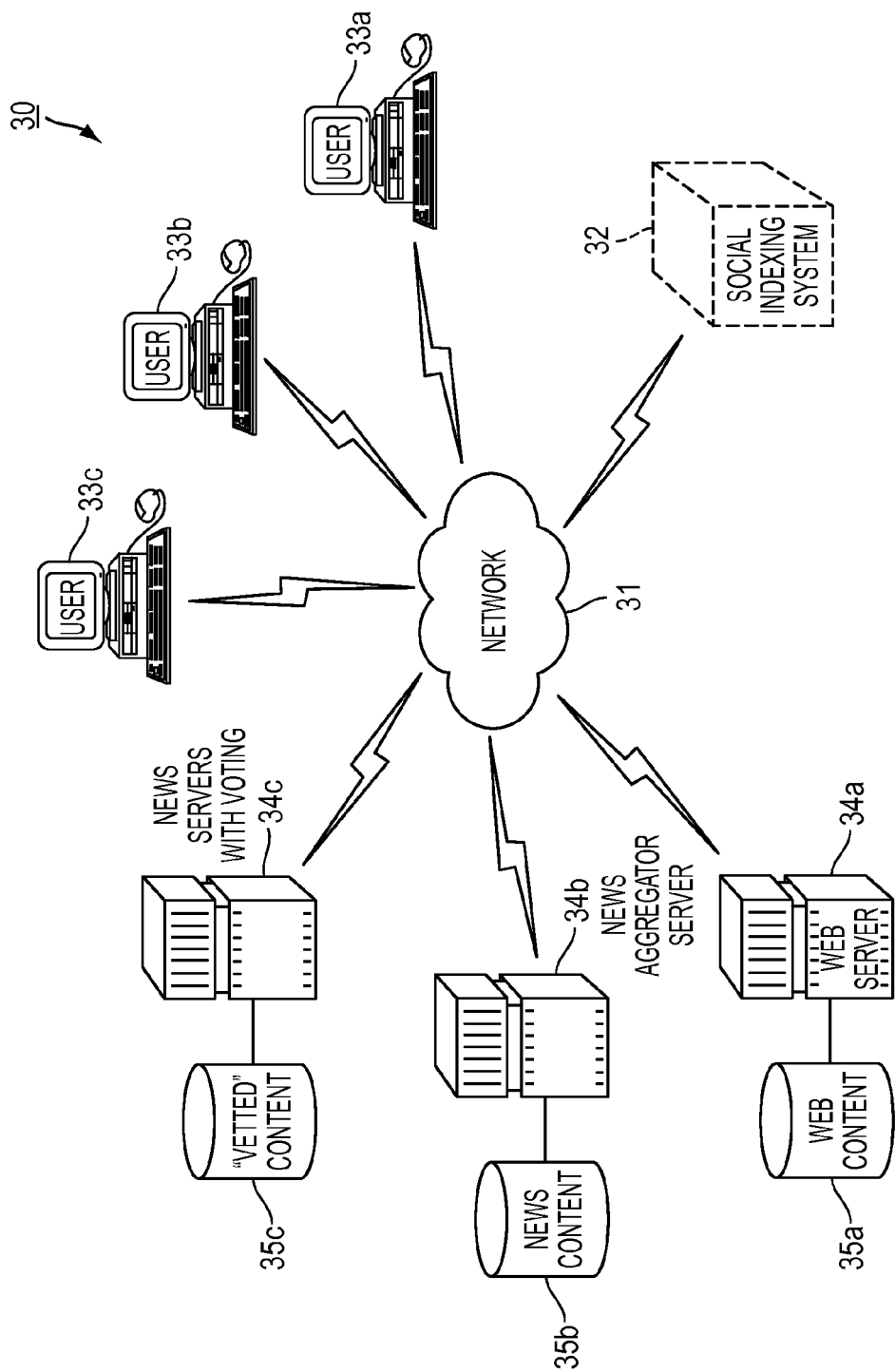
FIG. 3 is a block diagram showing an exemplary environment for digital information sensemaking.

Digital sensemaking is sensemaking mediated by a digital information infrastructure, which includes public data networks, such as the Internet, standalone computer systems, and various repositories of digital information. FIG. 3 is a block diagram showing an exemplary environment 30 for digital information sensemaking The same basic system components are utilized for digital information discovery 22, prospecting 23, and orientation 24.

Digital information is information available in digital form. A digital data communications network 31, such as the Internet, provides a suitable digital information exchange infrastructure, although other infrastructures are possible, for instance, a non-public corporate enterprise network. The network 31 provides interconnectivity to various information sources and information consumers that respectively provide and access the digital information. Web servers 34a, news aggregator servers 34b, news servers with voting 34c, and other digital information repositories serve as information sources. These sources respectively serve Web content 35a, news content 35b, community-voted or "vetted" content 35c, and other digital information to user devices 33a-c, such as personal computers and similar devices, that function as the information consumers.

In general, each user device 33a-c is a Web-enabled device that executes a Web browser or similar application, which supports interfacing to and information exchange with the servers 34a-c. Both the user devices 33a-c and servers 34a-c include components conventionally found in general purpose programmable computing devices, such as a central processing unit, memory, input/output ports, network interfaces, and non-volatile storage, although other components are possible. Moreover, other information sources in lieu of or in addition to the servers 34a-c, and other information consumers, in lieu of or in addition to user devices 33a-c, are possible.

Digital sensemaking and, in particular, digital information orientation 24, is facilitated by a social indexing system 32, which is also interconnected to the information sources and the information consumers via the network 31. The social indexing system 32 facilitates the automated orienting of digital information by combining topic models in evergreen indexes with specific content in an article or other writing that is being read by a reader who is possibly a newcomer to or unfamiliar with the article's subject matter.

Social Indexing System

Figure 4:
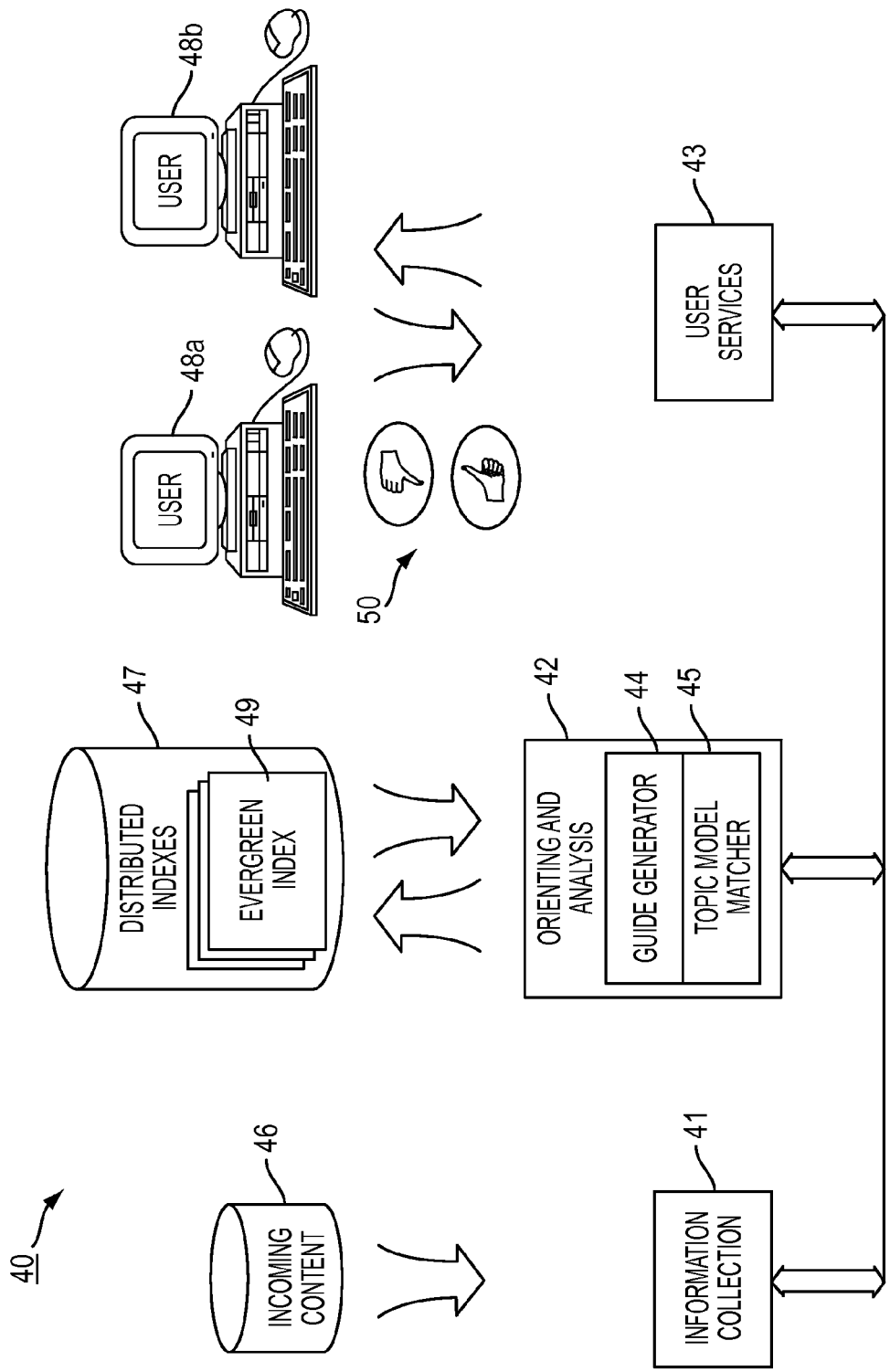
FIG. 4 is a functional block diagram showing principal components used in the social indexing system of FIG. 3.

From a user's point of view, the social indexing system appears as a single information portal, but is actually a set of services provided by an integrated digital information processing environment. FIG. 4 is a functional block diagram showing principal components 40 used in the social indexing system 32 of FIG. 3. The components are focused on digital information prospecting and other components may be used to provide digital information discovery, orienting, degree of interest, and other services.

The components 40 can loosely be grouped into three functional areas, information collection 41, orienting and analysis 42, and user services 43, although other functional areas are possible. The functional groups are interconnected and interdependent and can be implemented on the same or separate computational platforms. Information collection 41 obtains incoming content 46, such as Web content 35a, news content 35b, and "vetted" content 35c, from information sources, including Web servers 34a, news aggregator servers 34b, and news servers with voting 34c, The information sources include feeds and sources providing content to each augmented community. The incoming content 46 is collected by a media collector operating under the direction of a scheduler to periodically or on-demand harvest new information from the information sources. The incoming content 46 can be stored in structured repository, or indirectly stored by saving only references or citations to the incoming content in lieu of maintaining an actual copy of the incoming content locally, such as storing hyperlinks.

Information about a new subject area may be available somewhere online, but is of no help to a newcomer due to his unfamiliarity with the subject. Orienting and analysis 42 enables the newcomer to establish an informational footing in the subject area by exploiting the efforts of augmented communities who have already developed an expertise with the subject. Through a guide generator 44, the newcomer can explore articles on a specific topic within the new subject area, or research topics across the new subject area, as further described below beginning with reference to FIG. 8. The guide generator 44 relies on a topic model matcher 45, which exhaustively matches topic models from tens to hundreds of thousand evergreen indexes.

Finally, user services 43 provide a front-end to users 48a-b to access the distributed indexes 47 and the incoming content 46. Each evergreen index 49 is tied to a community of users, known as an "augmented" community, which has an ongoing interest in a core subject area. The community "vets" information cited by voting 50 within the topic to which the information has been assigned, as further discussed below beginning with FIG. 10.

Digital Information Discovery

An information "diet" characterizes what information a user consumes across subjects of special interest, as well as select content from frontier augmented communities, such as described in commonly-assigned U.S. Pat. No. 8,073,682, the disclosure of which is incorporated by reference. The diet also reflects the amount of time that the user is willing to allocate to "digesting" each subject. Digital information prospecting contributes to the first aspect of a diet, information in subjects of special interest.

Figure 5:
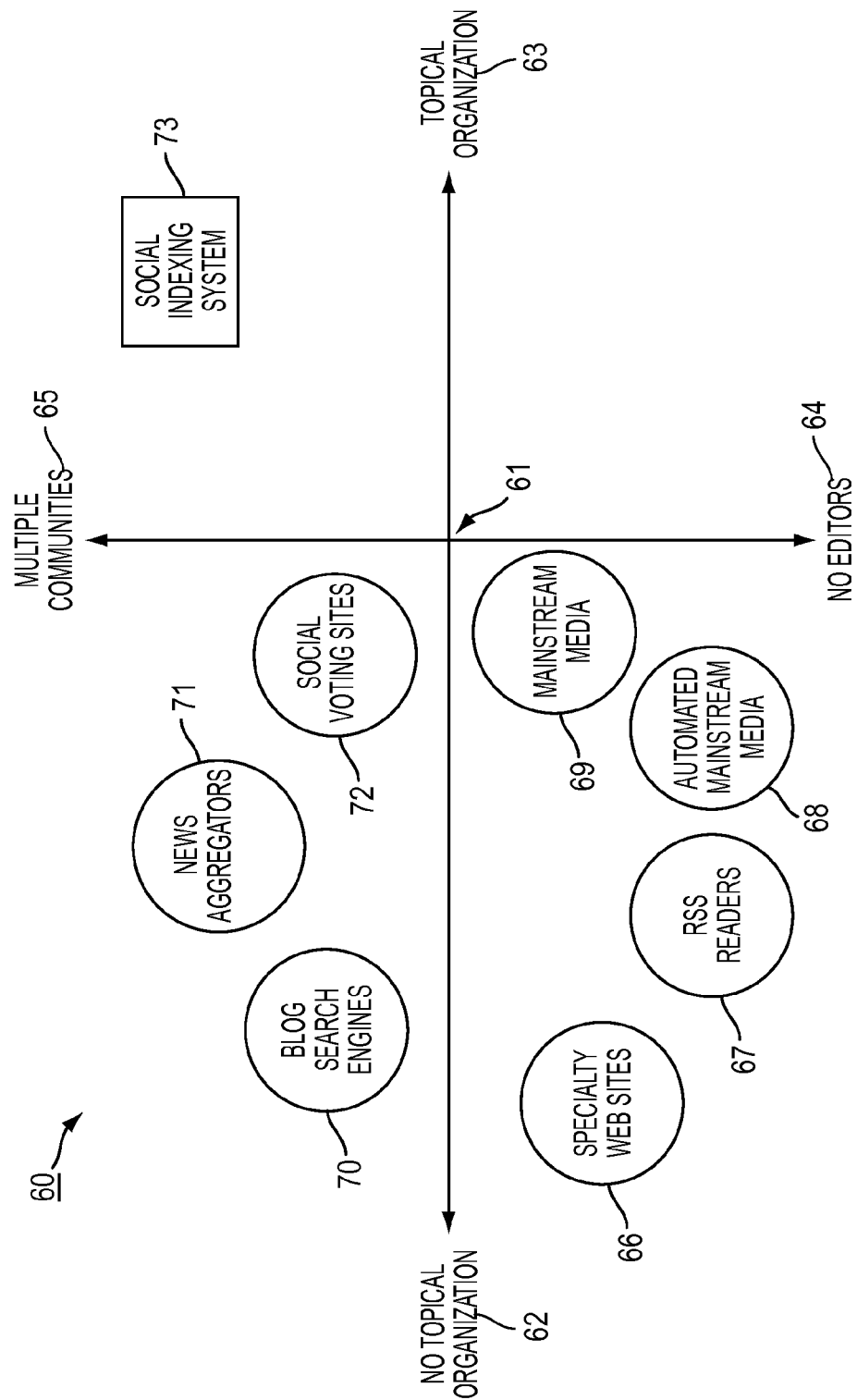
FIG. 5 is a graph showing, by way of example, the current organizational landscape of providers of digital information.

Prospecting relevant and authoritative digital information from outside a set of core topics to meet a user's information diet is important. Although all manner of data is widely available online, "raw" digital information obtained directly from a source generally lacks a comprehensive organizational scheme and competent ranking methodology. FIG. 5 is a graph 60 showing, by way of example, the current organizational landscape of providers of digital information. The bidirectional x-axis represents degree of topical organization of digital information and the bidirectional y-axis represents the amount of critical review, that is, "vetting." Information at the far left 62 of the x-axis lacks cohesive topical organization and refers to a single subject area. Under conventional approaches, the information is fairly static and organization is limited to a few topics. Information at the far right 63 of the x-axis enjoys a fine-grained and rich topical organization and covers multiple subject areas. Each subject area is deeply organized into many subtopics.

The y-axis characterizes the amount of expertise and labor that is used for "vetting" and ranking articles. No editing is performed on articles at the bottom of the y-axis and the articles are presented without any vetting. Closer to the origin 61, a small team of up to a few editors are engaged in vetting articles. Higher on the y-axis, a single community of people, "the light work of the many" and "the wisdom of the crowd," actively reads and votes on, or vets, articles. Multiple communities vet articles at the top of the y-axis, where each community focuses on a specific subject area.

At best, current approaches are coarsely organized and only lightly critically weighed, or "vetted." For instance, in the southwest quadrant, conventional organizational approaches use either a broad, coarse grained, or non-existent topical organization 62 with vetting by few or no editors 64. Specialty Web sites 66, such as Audiophilia, available at www.audiophilia.com, and hybridcars, available at www.hybridcars.com, serve narrow readership bases sheparded by a single dedicated editor with subject matter centered on a niche topic under which further topical organization is neither needed nor desired. RSS readers 67, such as Google reader, available at www.google.com/reader, automatically report new information under an automated feed on a dedicated topic. Similarly, automated mainstream media Web sites 68, such as Google news, available at news.google.com, use limited popular news categories under which information is automatically grouped without the need for an editor. The categorizing of articles, however, is limited by a very course grain, where the classification of articles in such broad categories can be done by selecting articles from single-topic sources, such as technology or sports news. Finally, mainstream media Web sites 69, such as the New York Times, available at ww.nytimes.com, and c|net, available at www.cnet.com, employ individual editors or small teams of editors that organize news into popular news categories, which may include a wider scope to topics than available through automated mainstream media Web sites 68. The lack of community-based and presumptively impartial vetting, and the lack of fine-grained topic organization prevent these approaches from providing information covering a wide range of subject areas that is relevant to augmented communities that are interested in them, or to neighboring communities who may be interested in them.

In slight contrast, in the northwest quadrant, current approaches also use either a broad, coarse grained, or non-existent topical organization 62 and offer vetting by individual or small communities of users 65. Blog search engines 70, such as Google blog search, available at googleblog.blogspot.com, and icerocket, available at www.icerocket.com, are Web search engines dedicated to blogs, but the blogs are passively searched without use of topical organization. News aggregators 71, such as Topix, available at www.topix.com, automatically collect news organized by zip code into broad, and usually popular, topic areas with limited community-based review. Finally, news Web sites with voting 72, such as Slashdot, available at www.slashdot.org, reddit, available at www.reddit.com, and digg, available at www.digg.com, offer slightly finer grained yet still relatively large topic categories with vetting by a single user community. Opening critical review to individual or small user communities increases impartiality and, therefore, user confidence in authoritativeness, but the similar lack of fine-grained topic organization prevents customized discovery of new relevant information. The northwest quadrant approaches are also limited to single user communities, as typified by the "techie-gamer" communities that frequent the Reddit and Digg Web sites, or, like the Topix Web site, have multiple communities, but do not have fine-grained topic coverage or diverse subject areas. Still, other approaches exist, such as Daylife, which has more topics than typical news Web sites, yet does not organize information into hierarchical topical indexes with fine-grained topics. Moreover, the site is not organized into communities with members and their indexes, nor can users define new communities.

In contrast to the foregoing conventional approaches, the approach described herein uses: (1) index training and extrapolation to enable the right-end of the x-axis, and (2) voting in multiple augmented communities to enable the top-end of the y-axis. The social indexing system 73 uniquely occupies the northeast quadrant by providing fine-grained topical organization 63 through evergreen indexes 49 in conjunction with vetting by multiple user communities 65. The social part refers to the human element in the process. This organizational approach and community-based vetting ensures that each user receives both relevant and authoritative information in all of his subject areas of interest, which have been selected by the user to become oriented to a new subject area.

Evergreen Index Overview

An evergreen index identifies and relates materials along expert-chosen topical joints, which reflect the expert's point of view on behalf of his augmented community as to material that is important. An evergreen index embodies judgments of how people in the augmented community will use the information cited and reflects a subject matter expert's articulation of important topics and references to where the topics are discussed.

The division of information into fine-grained categories enables several capabilities, including providing the capability to segregate article votes into fine-grained topic groups, rather than just one or a few large subject area groups. This capability also enables the estimating of article quality on a fine grain, and provides meaningful comparison of articles within a topic. Absent this capability, the utility of voting is mainly for determining "most popular" stories. Long tail stories, that is, stories of narrow interest, essentially disappear from view. Another benefit of hierarchical topic organizations makes possible the ability to associate user-editable "wiki-like" commentary with each topic in a community. This ability provides a place for community discussion and summarization of each topic.

Figure 6:
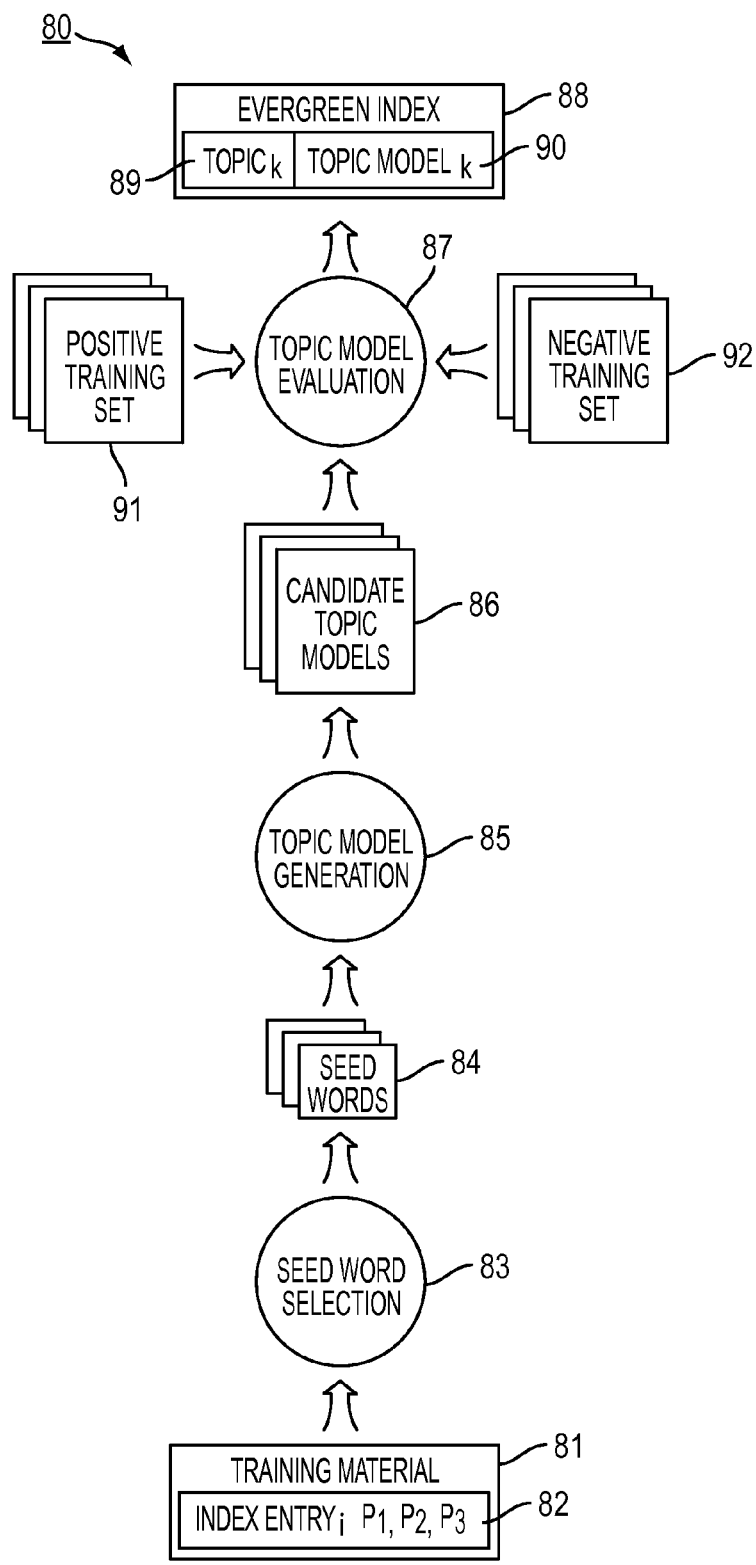
FIG. 6 is a data flow diagram showing an overview of evergreen index training.

An evergreen index is created through supervised machine learning and applied by index extrapolation, such as described in commonly-assigned U.S. Pat. No. 8,165,985, the disclosure of which is incorporated by reference. FIG. 6 is a data flow diagram showing an overview of evergreen index training In brief, an evergreen index 88 is formed by pairing a topic or subtopic 89 with a topic model 90. The evergreen index 88 is trained by starting with a training index 81, which can be either a conventional index, such as for a book or hyperlinks to Web pages, or an existing evergreen index. For each index entry 82, seed words 84 are selected (operation 83) from the set of topics and subtopics in the training index 81. Candidate topic models 86, such as patterns, are generated (operation 85) from the seed words 84. The topic models transform direct page citations, such as found in a conventional index, into an expression that can be used to test whether a given text is on topic. Topic models can be specified as patterns as well as term vectors or any other form of testable expression. Finally, the candidate topic models 86 are evaluated (operation 87) against positive and negative training sets 91, 92. As the candidate topic models 86 are generated in order of increasing complexity and decreasing probability, the best candidate topic models 86 are usually generated first. By favoring simple or low complexity candidate topic models 86, the topic model evaluator follows the philosophy of Occam's razor to choose the simplest candidate topic models 86 that explain the data. Considerations of structural complexity are also helpful to avoid over-fitting in machine learning, especially when the training data is sparse.

The automatic categorization of new digital information using an evergreen index is a continual process. The topic models 90 in an evergreen index 88 enable new and relevant digital information to be automatically categorized by topic 89 through index extrapolation. Unlike a conventional index, an evergreen index 88 contains topic models 89 instead of citations, which enables the evergreen index 88 to function as a dynamic structure that is both untied to specific digital information and applicable over any digital information. New pages, articles, or other forms of digital information are identified, either automatically, such as through a Web crawler, or manually by the augmented community or others. The pages are matched against the topic models 90 of an evergreen index 88 to determine the topics or subtopics 89, which best fit the information. Not every document will find a correctly matching topic model 90. Some information may be wrongly matched, while other information may not be matched at all, yet still be worthy of addition to the evergreen index 88 as a new topic or subtopic 89.

Evergreen Index Topical Scope

Each evergreen index organizes an augmented community's mapping and implicit understanding of a subject area through a layered structuring of topics and subtopics. An evergreen index is collectively created and evolved through the guidance of knowledge domain experts, that is, the leaders of the augmented community who are responsible for shepparding the topics of an evergreen index, and by the members of the community who read and rank, that is, "vet," articles appearing under the evergreen index.

Each augmented community exists as a separate entity from other augmented communities. The separateness or identity of a community is reflected by the community's evergreen index. Yet, despite their separate existences, similarities in and overlapping of the subject matter embraced by each community occurs as a natural side-effect of drawing from a common set of online resources. FIG. 7 is a data flow diagram 100 showing, by way of example, the scopes of core subject matter for sets of augmented communities. The extent of the interrelatedness of the information known to the augmented communities depends upon the scope of the subject matter cited in their respective evergreen indexes.

Augmented communities often share access to common information sources, such as Web sites and feeds, and each community carves out an area for their own core interests through the topical models inherent in their respective evergreen indexes. The evergreen indexes are populated through digital information discovery, such as described in commonly-assigned U.S. Pat. No. 8,165,985, the disclosure of which is incorporated by reference. Interrelatedness and overlapping of topical interests occurs along the informational boundaries of each augmented community, which constitutes an information frontier for a particular community.

The subject area of an evergreen index could be broadly specified, such as baseball 102*a*, motorcycles 102*b*, or medicine 102*c*, Within the subject area, each augmented community interactively builds their layering of topics, typically beginning with a rudimentary outline of expansive topics that are collaboratively expanded and refined into a more concise set of particularized topics and subtopics tailored to the interests and tastes of the community. As an evergreen index matures and grows, the topic models paired to the individual topics become increasingly pinpoint and develop the capacity to match a larger, yet more exacting part of the corpus. The potential for overlap of the sources and topics used by individual augmented communities thus grows.

Augmented communities can be arranged as a social network that expresses relationships among those communities within the network who are interested in related subject matter. Neighboring augmented communities, commonly interested in the same subject, such as baseball 103*a-d*, motorcycles 104*a-d*, and medicine 105*a-c*, form a set of augmented communities within which different interpretations of the shared subject matter may be found. A newcomer 101 can look to each set of augmented communities 102*a* and 103*a-d*, 102*b* and 104*a-d*, 102*c* and 105*a-c*, as resources through which to become oriented.

Digital Information Orienting

Figure 8:
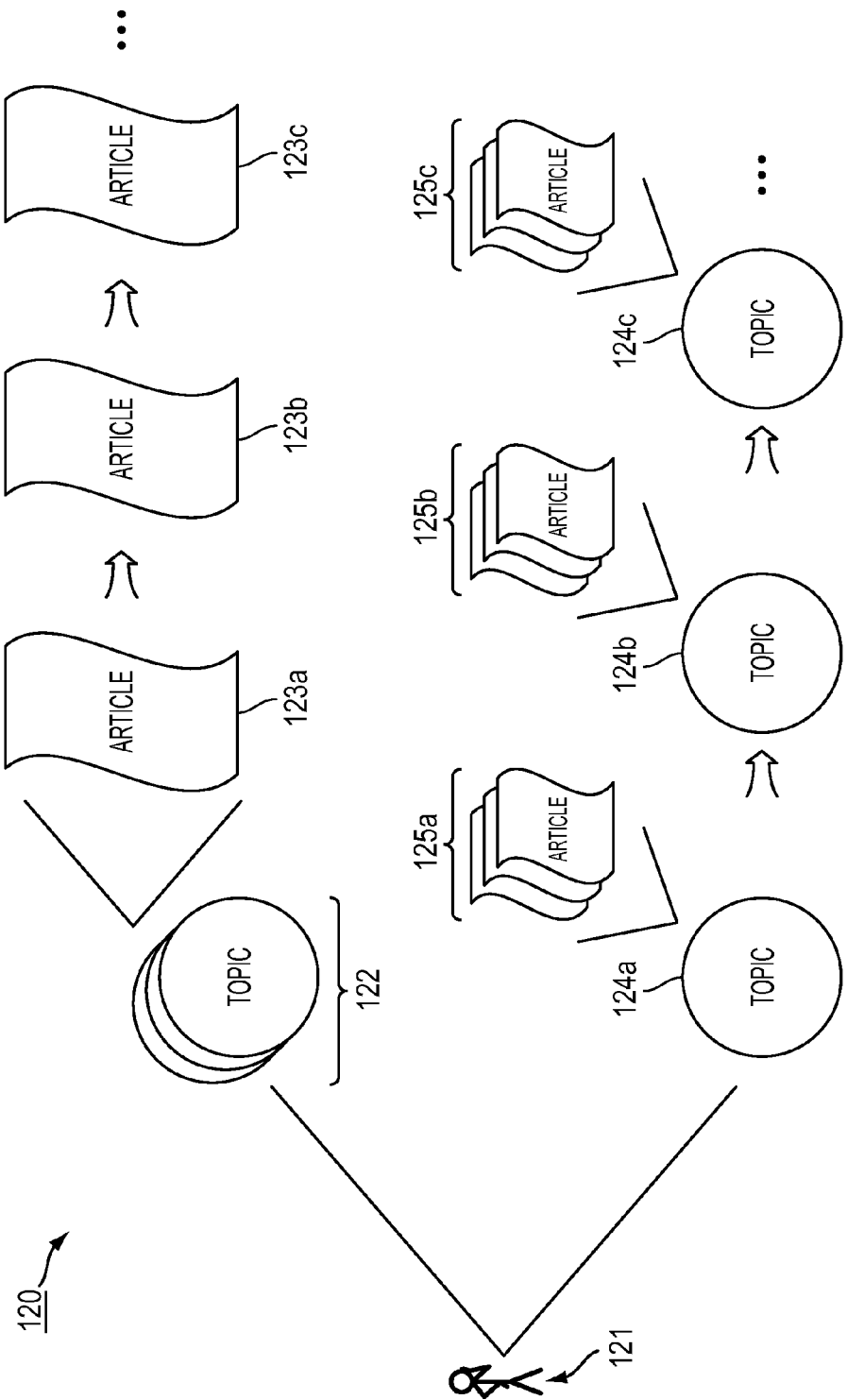
FIG. 8 is a data flow diagram showing a method for providing orientation into digital information in accordance with one embodiment.

To members of an augmented community, the topics and subtopics found in their evergreen index represent how they prefer to organize and access information on their chosen subject. To an outsider, the evergreen index topically describes an organizational scheme that has proven useful to people who are already familiar with or "oriented" to a subject. FIG. 8 is a data flow diagram showing a method 120 for providing orientation into digital information in accordance with one embodiment. The method 120 is performed as a series of process steps by a server or other computing device.

A reader 121 can become oriented by employing two distinct, yet interdependent, forms of guided searching across articles and topics. The reader 121 starts with an article from which a guide is generated, as further described infra. The guide pairs the article with a hierarchically arranged listing of topics found within the article. Each topic is coupled to a topic model and the reader 121 can select a topic to retrieve more information using a user interface, such as further described below with reference to FIG. 10. One listing can be generated per augmented community and the reader 121 can explore the listings provided with each community to find a listing that best suits his needs.

Thus, the topics and subtopics in an evergreen index can be analogized to the important questions to ask in respect of the index's subject area. The articles and writings referenced through the topics and subtopics provide endorsed answers to those implicit questions. A reader 121 trying to learn more about a specific topic 122 found within an article that he is reading could hop from one article 123a referenced by the topic models for that topic 122, to other articles 123b-c on the same topic. Alternatively, the reader 121 could stay focused on just one topic 124a-c by looking at what articles 125a-c other augmented communities have referenced for that topic through their respective evergreen indexes. Other operations are possible.

Guide Generation

An augmented community serves a social group whose members focus their collective attention on one or more core topics. Digital information orienting enables a newcomer who is unfamiliar with a new subject to quickly get his bearings by simply requesting a guide that navigates those core topics. A guide exploits the work of other augmented communities.

A guide may be needed under various circumstances. For instance, a user may decide that he would like a guide to the topics on the page that he is reading, such as described in commonly-assigned U.S. Patent Application, Publication No. 2008/0027707, published Jan. 31, 2008, pending, the disclosure of which is incorporated by reference. Alternatively, a user could begin by typing a query and the system automatically creates a guide to topics that address the query, such as described in commonly-assigned U.S. Pat. No. 7,203,899, the disclosure of which is incorporated by reference. In both situations, the input, whether page or query, is used to set constraints on the topics of interest. The system then displays a subset of the full index that matches the constraints. The subset could be provided in different ways, which include:

1) Given a complete, lexicographically-sorted index, traverse the index and display only those topics meeting the constraints. For a page, the subset would include only those topics whose patterns match the page. For a query, only those topics with a sufficiently high characteristics word score relating to the query would be returned.

2) Given a set of topics, determine the topics that match and sort the matching topics lexicographically.

Each augmented community is characterized by an evergreen index, which lists those topics and subtopics reflecting the community's core interests. A newcomer requests the social indexing system to create a guide to match topics from evergreen indexes to an article that he is reading. The guide serves several digital information sensemaking needs. In one scenario, a user is looking for the "best community" to address a topic of interest. This need is a kind of community search. Another scenario is known as "social transparency," which concerns the ability to see from one community to another, such as provided by tabularly organizing the social indexes of neighboring communities, such as further described below with reference to FIG. 9. For example, if the user is reading articles about the Presidential election from a "California democrats" index, there might be visibility into other indexes, such as the "Green party," "California Republicans," "Libertarians," and so forth, where similar articles on similar topics, albeit from different perspectives, are being discussed. In the scenario of social transparency, the presentation involves contributions from members of multiple communities.

The guide serves several functions. First, the guide provides the reader with a reduced or focused index, which is a hierarchy of topics and subtopics from matching evergreen indexes. The guide also identifies those augmented communities that address the matching topics. Finally, the guide provides the sources of information used by the matching communities, including where to get the information, who is using the sources, and what augmented communities constitute possible neighbors by virtue of sharing the same information sources.

The guide can be generated through topic model matching, as further described infra, or through non-characteristic word modeling techniques, such as scent index determination, such as described in commonly-assigned U.S. Pat. No. 7,203,899, the disclosure of which is incorporated by reference. In one embodiment, scent indexes are based on co-occurrence relationships determined though a fixed-size sliding window. The search terms of user queries are automatically expanded based on the co-occurrences identified and a spreading activation from the user queries is applied to label terms to yield likely evergreen index entries. The entries are then provided as a guide to learning more about a topic in the article that the newcomer is reading, such as further described below with reference to FIG. 10. Other guide creation methodologies are possible.

The need to become oriented generally occurs when a reader is faced with reading a page taken out of an article belonging to a new, yet unfamiliar subject area. The page may be from an arbitrary Web search, as the result of a search over respected sources used by trusted augmented communities, or originating in some other fashion. Whether some topic appearing on the page, or even the page itself, is the starting point, the reader is still faced with figuring out where to start. Therefore, topic models from one or more evergreen indexes are matched against the page in response to the reader's request for a guide, although matching to tens to hundreds of thousand evergreen indexes would be more apt to yield superior results. Other matching of references to the corpus are possible.

A user can request a guide to available social indexes by indicating a user interest, which can occur in several ways. For instance, a user identify topics found in an article that he is reading or has open. In response, the social indexing system loops through all of the known indexes and, for each index, matches topics to the article. The system create a list of indexes that contains those indexes having topics, or the most topics, that match. This approach uses the pattern-based topic models created by index extrapolation.

In a further embodiment, a user could enter a query that includes some topic search terms. Alternatively, a user could browse a topic hierarchy, such as provided by the topics appearing in an evergreen index, and choose a topic of interest. With these starting points, the social indexing system examines all of the known community indexes and creates a list of indexes that contains topics that best match the article, or topical search terms, respectively. This approach uses characteristic word models of the topics, as computed by the articles in each of the topic areas.

Following matching, the evergreen indexes that present with positive matches to the page are rated, such as by percentage of topics within the page matched. Finally, the topic model are provided to the reader through a dual search user interface, as further described below with reference to FIG. 10. In one embodiment, articles in the corpus are classified using the topic models identified and provided within the user interface by degree of interest. Other topic model matching operations are possible.

User Interface

Information discovery in social indexing is the combination of index extrapolation with topic-delimited voting. Voting personifies the "light work of the many." Fine-grained categorization is crucial to voting because the categorization accounts for the assessment of the articles under each topic. Categorization ascertains which articles are the best and most worthy of the reader's attention. Voting is provided through a user interface that puts a face onto the evergreen index.

Figure 9:
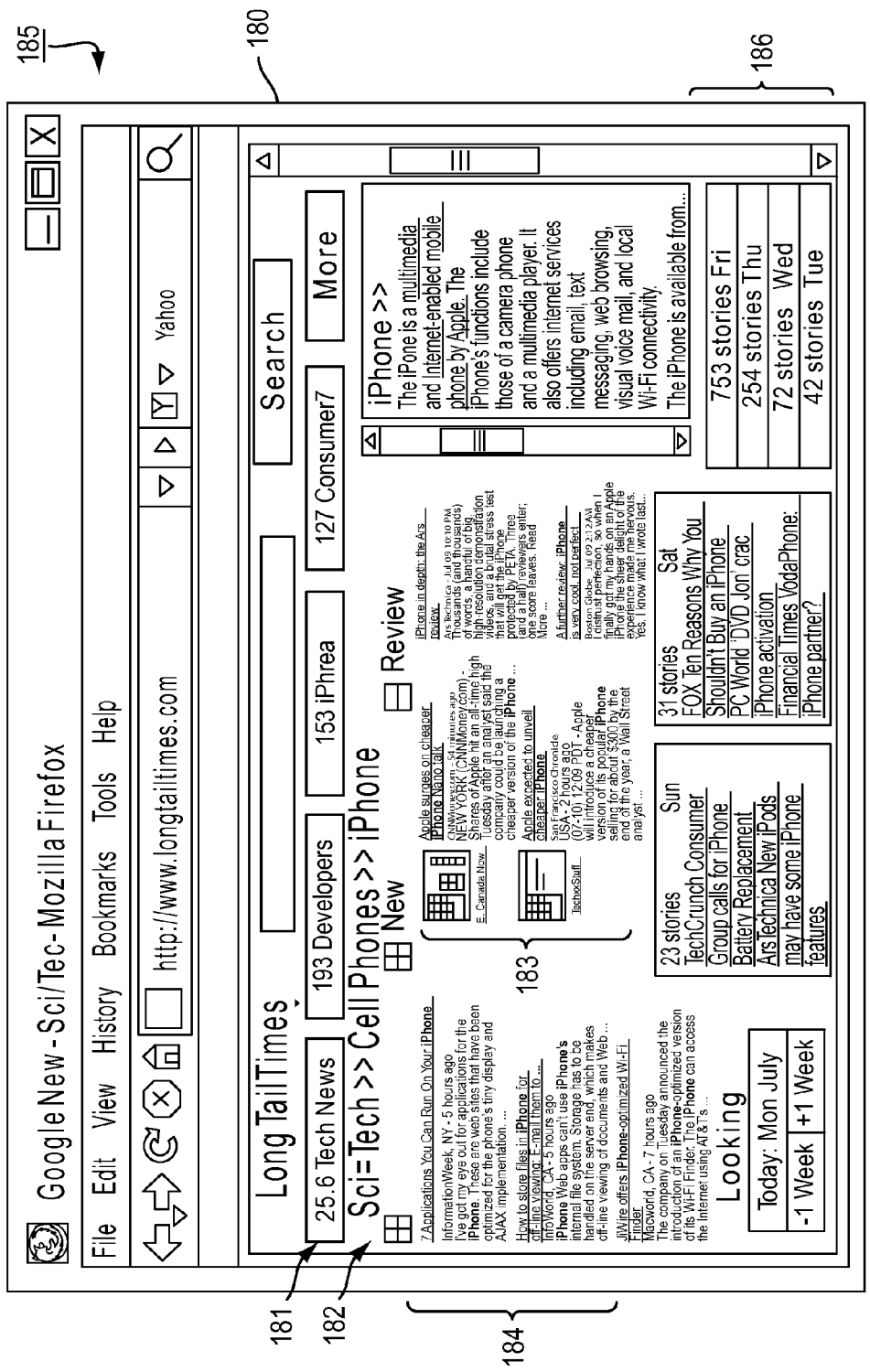
FIG. 9 is a screen shot diagram showing, by way of example, a user interface providing digital information organized by degree of interest.

Web browsers have become a ubiquitous and widely-adopted information provisioning interface, which provides an ideal, although non-exclusive, platform for spatially presenting digital information for use in orientation. FIG. 9 is a screen shot diagram showing, by way of example, a user interface 180 providing digital information organized by degree of interest. The user interface 180 brings together the two aspects of an information diet, relevancy and degree of interest, with voting. The user interface 180 provides an illustrative presentation, but other interfacing methodologies are equally possible.

The ratings of digital information voted by each augmented community can be provided on individual Web pages indexed by tabs 181 or other markers. The tabs enable a reader to experience social transparency, that is, an ability to see what other augmented communities are thinking in respect of similar or related topics. The tabs serve to bias presentation of the evergreen indexes by matching the topics in the indexes to user interest. The reader need only select a tab to learn how a neighboring community has vetted an area of interest. Other visual or organizational layouts are possible.

Within each augmented community's tab, the topics and subtopics 182 of that augmented community can be listed first, with larger fonts or more prominent display attributes highlighting the most popular documents. The topics and subtopics 182 are selected from the augmented community's evergreen index and the documents are identified by matching a corpus of digital information against the topic models in the evergreen index, which can include digital information prospected from frontier communities, as described supra.

Degree of interest (DOI) refers to a numeric measure that is derived and intended to reflect how interesting some information will be. DOI can be determined relative to a particular article on a given topic, and can also be computed to relate a secondary topic to a primary one. DOI can be tailored to an individual based on information specific to the individual's history or state. When available, DOI can be used to optimize the presentation of information so that information with the highest DOI is favored, such as by giving the information more space or prominence. For instance, the highest ranked pages 183 can be allocated the largest amount of space with graphics, title, information regarding the source of the article, and abstract all provided. Other information or forms of visual or display emphasis could also be provided. Similarly, less highly rated pages 184 can be allocated less space, no graphics, and use smaller font sizes. Finally, lowest rated pages 185 can be relegated to the bottom of the tab with only the source and title of the page provided. Summarizations of the numbers of overall pages 186 can also be included as a convenience.

Dual-Pane User Interface

Figure 10:
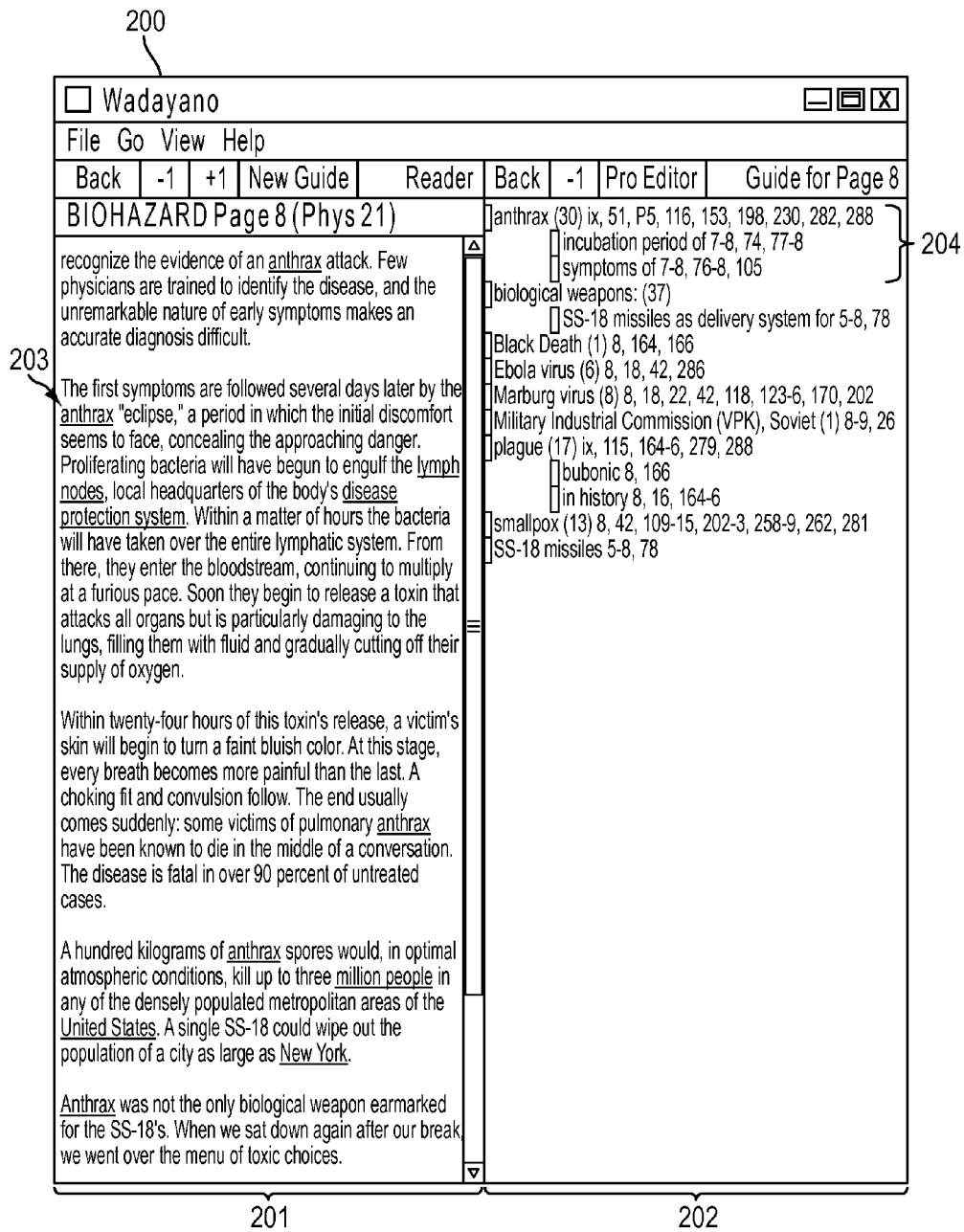
FIG. 10 is a screen shot diagram showing, by way of example, a user interface providing digital information orienting.

A guide produces at least one focused index for each evergreen index having topic models that match a page of an article submitted by a reader. FIG. 10 is a screen shot diagram showing, by way of example, a user interface 200 providing digital information orienting. The user interface 200 is organized into two panes 201, 202, although a single combined pane or multiple combinations of panes could also be used. A reading pane 201 is used to navigate among pages in a book or online subject area of interest. An index pane or "guide" 202 provides the focused index, which the reader views a relevant subset of an evergreen index 204 that is limited to the topics and subtopics represented in the text 203 of the reading pane. In a further embodiment, the reader can enter a topic of interest as a query, which is used in place of the page from the article. In a still further embodiment, where the page has been taken from a book or other form of paginated corpus, a reverse lookup of all index entries matching the page number can be performed and those topics having matching page numbers are provided. The reader access the focused indexes of other augmented communities having matching topic models by selecting another tab. The evergreen indexes are arranged in order of their ranking as determined by the social indexing system. Other user interfaces are possible.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing orientation into subject areas of digital information for augmented communities, comprising:
 a memory;
 a processor operatively couple to the memory and configured to execute computer executable program modules, comprising:
  an information collection module configured to obtain a plurality of topics for each subject area in a plurality of subject areas, each subject area being associated with an augmented community, each topic being hierarchically organized under a fine-grained topic category in a topic hierarchy;
  an information storage module configured to maintain a plurality of evergreen indexes, each evergreen index comprising a plurality of topic models that are each matched to one of the topics in the topic hierarchy associated with each augmented community;
  an interrelatedness module configured to determine interrelatedness of the plurality of evergreen indexes by identifying the topics found in the topic hierarchy for each evergreen index that are shared;
  a social network module configured to arrange a social network comprising neighbors made up of each augmented community associated with each of the plurality of evergreen indexes that are interrelated;
  an interest module configured to determine a user interest in digital information for a subject area;
  an evaluation module configured to evaluate each of the plurality of topic models for the evergreen indexes against the digital information, comprising;
   a best matching module configured to identify one of the evergreen indexes quantitatively best matched to the digital information; and
   a neighbor matching module configured to identify the other evergreen index associated with each augmented community that is a neighbor of the augmented community with the identified evergreen index; and
  an evergreen index access module configured to provide access to the digital information of the subject area via at least one of the identified best matched evergreen index and the identified other evergreen index.

2. A system according to claim 1, further comprising:
 a similarity topic module configured to identify similarities in core subject matter of each topic between at least two sets of the augmented communities; and a neighbor classification module configured to classify the augmented communities as neighbors sharing at least one topic in common.

3. A system according to claim 1, the plurality of evergreen indexes further comprising:
a topic category module configured to receive each topic model matched to one of the topics for each evergreen index being sheparded and vetted into at least one of the fine-grained topic categories based on at least one member of the augmented community associated with the evergreen index.

4. A system according to claim 1, further comprising:
a commentary module configured to associate user-editable commentary with each topic associated with the augmented community.

5. A system according to claim 1, further comprising:
a new information module configured to identify new digital information;
a new information matching module configured to match the new digital information against the topic models of the evergreen index and determining topics of the new digital information; and
a new information addition module configured to add the topics of the new digital information into the matched evergreen index.

6. A system according to claim 1, the topic model further comprising at least one of:
a pattern module configured to obtain a pattern evaluable against the digital information; and
a term vector module configured to obtain term vectors evaluable against the digital information.

7. A system according to claim 1, further comprising:
a user interface module configured to provide access to the digital information through a user interface,
wherein the user interface displays a list of the topics for at least one of the identified evergreen indexes visually separated by each of the identified evergreen indexes.

8. A system according to claim 7, wherein the list is based on at least one of relevancy to the determined user interest and a degree of interest tailored to a user based on information specific to the user's history or state.

9. A system according to claim 1, further comprising:
a ranking module configured to associate a ranking with each of the topics of at least one of the evergreen indexes as assigned by the augmented communities; and
a presentation module configured to present the digital information regarding each topic associated with the ranking on the user interface based on the ranking of their respective evergreen indexes.

10. A system according to claim 1, wherein the digital information comprises one or more of printed documents, Web pages, and material written in a digital media.

11. A computer-implemented method for providing orientation into subject areas of digital information for augmented communities, comprising:
obtaining a plurality of topics for each subject area in a plurality of subject areas, each subject area being associated with an augmented community, each topic being hierarchically organized under a fine-grained topic category in a topic hierarchy;
maintaining a plurality of evergreen indexes, each evergreen index comprising a plurality of topic models that are each matched to one of the topics in the topic hierarchy associated with each augmented community;
determining interrelatedness of the plurality of evergreen indexes by identifying the topics found in the topic hierarchy for each evergreen index that are shared;
arranging a social network comprising neighbors made up of each augmented community associated with each of the plurality of evergreen indexes that are interrelated;
determining a user interest in digital information for a subject area;
evaluating each of the plurality of topic models for the evergreen indexes against the digital information, comprising;
identifying one of the evergreen indexes quantitatively best matched to the digital information; and
identifying the other evergreen index associated with each augmented community that is a neighbor of the augmented community with the identified evergreen index; and
providing access to the digital information of the subject area via at least one of the identified best matched evergreen index and the identified other evergreen index,
wherein a non-transitory computer readable storage medium stores code for executing on a computer system to perform all the method steps.

12. A method according to claim 11, further comprising:
identifying similarities in core subject matter of each topic between at least two sets of the augmented communities; and
classifying the augmented communities as neighbors sharing at least one topic in common.

13. A method according to claim 11, the plurality of evergreen indexes further comprising:
receiving each topic model matched to one of the topics for each evergreen index being sheparded and vetted into at least one of the fine-grained topic categories based on at least one member of the augmented community associated with the evergreen index.

14. A method according to claim 11, further comprising:
associating user-editable commentary with each topic associated with the augmented community.

15. A method according to claim 11, further comprising:
identifying new digital information;
matching the new digital information against the topic models of the evergreen index and determining topics of the new digital information; and
adding the topics of the new digital information into the matched evergreen index.

16. A method according to claim 11, the topic model further comprising at least one of:
obtaining a pattern evaluable against the digital information; and
obtaining term vectors evaluable against the digital information.

17. A method according to claim 11, further comprising:
providing access to the digital information through a user interface; and
displaying on the user interface a list of the topics for at least one of the identified evergreen indexes visually separated by each of the identified evergreen indexes.

18. A method according to claim 17, wherein the list is based on at least one of relevancy to the determined user interest and a degree of interest tailored to a user based on information specific to the user's history or state.

19. A method according to claim 11, further comprising:
associating a ranking with each of the topics of at least one of the evergreen indexes as assigned by the augmented communities; and
presenting the digital information regarding each topic associated with the ranking on the user interface based on the ranking of their respective evergreen indexes.

20. A method according to claim 11, wherein the digital information comprises one or more of printed documents, Web pages, and material written in a digital media.

* * * * *